US012110058B2

(12) United States Patent
Deckard et al.

(10) Patent No.: US 12,110,058 B2
(45) Date of Patent: Oct. 8, 2024

(54) SIDE-BY-SIDE VEHICLE

(71) Applicant: Polaris Industries Inc., Medina, MN (US)

(72) Inventors: Aaron D. Deckard, Zionsville, IN (US); Brian M. Safranski, Warroad, MN (US); Richard L. Sunsdahl, Badger, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/223,717

(22) Filed: Apr. 6, 2021

(65) Prior Publication Data

US 2021/0221437 A1 Jul. 22, 2021

Related U.S. Application Data

(63) Continuation of application No. 15/642,462, filed on Jul. 6, 2017, now Pat. No. 10,994,785, which is a continuation of application No. 14/171,635, filed on Feb. 3, 2014, now Pat. No. 9,701,346, which is a continuation of application No. 12/484,888, filed on Jun. 15, 2009, now Pat. No. 8,640,814.

(51) Int. Cl.
| | | |
|---|---|---|
| *B62D 21/18* | (2006.01) | |
| *B60N 2/01* | (2006.01) | |
| *B60N 2/38* | (2006.01) | |
| *B60R 21/13* | (2006.01) | |

(52) U.S. Cl.
CPC ............ *B62D 21/183* (2013.01); *B60N 2/01* (2013.01); *B60N 2/38* (2013.01); *B60R 21/13* (2013.01); *Y10T 403/551* (2015.01); *Y10T 403/5773* (2015.01); *Y10T 403/66* (2015.01)

(58) Field of Classification Search
CPC .......... B62D 21/183; B60N 2/01; B60N 2/38; B60R 21/13; Y10T 403/551; Y10T 403/5773; Y10T 403/66
See application file for complete search history.

(56) References Cited

U.S. PATENT DOCUMENTS

| | | | | |
|---|---|---|---|---|
| 2,128,930 | A * | 9/1938 | Fageol | B62D 47/003 296/64 |
| 2,527,487 | A * | 10/1950 | Paton | B60K 11/08 180/292 |
| 3,600,768 | A | 8/1971 | Romanzi et al. | |

(Continued)

FOREIGN PATENT DOCUMENTS

| | | |
|---|---|---|
| CN | 1701990 A | 11/2005 |
| CN | 2763120 Y | 3/2006 |

(Continued)

OTHER PUBLICATIONS

2008 Dealer Expo Top UTV Products—Rhinos, Rangers and RZRs were everything at th . . . , dated Feb. 18, 2008, (6 pages).

(Continued)

*Primary Examiner* — Timothy Wilhelm
(74) *Attorney, Agent, or Firm* — Faegre Drinker Biddle & Reath LLP

(57) ABSTRACT

The present invention relates to all terrain vehicles having at least a pair of laterally spaced apart seating surfaces. More particularly, the present invention relates to side-by-side all terrain vehicles having plural rows of seats.

21 Claims, 15 Drawing Sheets

(56) References Cited

U.S. PATENT DOCUMENTS

| | | | |
|---|---|---|---|
| 4,042,277 A * | 8/1977 | Fisher | B60R 22/023 |
| | | | 200/61.58 B |
| 4,083,561 A | 4/1978 | Daffer, Jr. | |
| 4,215,895 A | 8/1980 | Philips | |
| 4,267,895 A * | 5/1981 | Eggert, Jr. | B60K 1/04 |
| | | | 903/952 |
| 4,344,718 A | 8/1982 | Taylor | |
| 4,660,345 A | 4/1987 | Browning | |
| 4,691,818 A | 9/1987 | Weber | |
| 4,798,400 A * | 1/1989 | Kosuge | B62D 21/183 |
| | | | 180/311 |
| 5,135,080 A | 8/1992 | Haston | |
| 5,203,135 A | 4/1993 | Bastian | |
| 5,306,044 A | 4/1994 | Tucker | |
| 5,327,989 A * | 7/1994 | Furuhashi | B60K 17/165 |
| | | | 180/908 |
| 5,392,873 A * | 2/1995 | Masuyama | B60L 50/64 |
| | | | 180/68.5 |
| 5,465,929 A | 11/1995 | Dooley | |
| 5,487,564 A * | 1/1996 | Fueller | B60R 22/24 |
| | | | 280/808 |
| 5,588,672 A | 12/1996 | Karlow et al. | |
| 5,642,957 A | 7/1997 | Lange | |
| D390,501 S * | 2/1998 | Kranz | D12/86 |
| 5,871,255 A * | 2/1999 | Harland | B60N 2/36 |
| | | | 297/378.13 |
| 5,913,562 A * | 6/1999 | Mattarella | B60N 3/02 |
| | | | 296/152 |
| 5,947,519 A | 9/1999 | Aloe et al. | |
| 5,997,069 A * | 12/1999 | Coffey | B60N 2/01583 |
| | | | 296/65.01 |
| 6,010,182 A * | 1/2000 | Townsend | B64C 1/08 |
| | | | 296/29 |
| 6,135,497 A | 10/2000 | Sutherland et al. | |
| 6,142,253 A * | 11/2000 | Mueller | B62K 11/10 |
| | | | 180/908 |
| 6,257,797 B1 | 7/2001 | Lange | |
| 6,293,588 B1 | 9/2001 | Clune | |
| 6,293,610 B1 * | 9/2001 | Howard | A63B 55/60 |
| | | | 180/908 |
| 6,293,616 B1 * | 9/2001 | Williams | B60K 37/00 |
| | | | 296/210 |
| 6,309,024 B1 | 10/2001 | Busch | |
| 6,502,859 B1 | 1/2003 | Svetlik | |
| 6,530,448 B2 | 3/2003 | Abels et al. | |
| 6,533,348 B1 | 3/2003 | Jaekel et al. | |
| 6,550,849 B1 * | 4/2003 | Dosdall | B62D 33/06 |
| | | | 296/146.12 |
| 6,652,020 B2 | 11/2003 | Few | |
| D483,695 S * | 12/2003 | Bellington | D12/16 |
| 6,773,054 B2 | 8/2004 | Martini | |
| 6,805,380 B2 * | 10/2004 | Namiki | B60R 21/18 |
| | | | 280/801.1 |
| D498,435 S | 11/2004 | Saito et al. | |
| D503,905 S | 4/2005 | Saito et al. | |
| 6,926,350 B2 | 8/2005 | Gabbianelli et al. | |
| 7,036,869 B1 | 5/2006 | Stipanovich | |
| 7,093,872 B2 * | 8/2006 | Stanfield | B60R 9/00 |
| | | | 180/908 |
| 7,121,623 B2 * | 10/2006 | Fujihara | B60N 2/01 |
| | | | 297/452.21 |
| 7,125,069 B2 | 10/2006 | Cacucci et al. | |
| 7,207,613 B2 | 4/2007 | Walter et al. | |
| 7,249,798 B2 * | 7/2007 | Saito | B60N 2/36 |
| | | | 296/210 |
| D555,036 S | 11/2007 | Eck | |
| 7,322,106 B2 | 1/2008 | Marando et al. | |
| 7,325,832 B2 * | 2/2008 | Miki | B62D 25/087 |
| | | | 280/756 |
| 7,445,075 B2 * | 11/2008 | Ozawa | B62J 1/12 |
| | | | 180/908 |
| 7,464,962 B2 | 12/2008 | Hakansson et al. | |
| 7,488,022 B2 | 2/2009 | Belwafa et al. | |
| 7,556,291 B2 | 7/2009 | Gale et al. | |
| 7,578,523 B2 * | 8/2009 | Kosuge | B62D 21/186 |
| | | | 296/29 |
| 7,578,544 B1 * | 8/2009 | Shimamura | B62D 47/003 |
| | | | 296/26.11 |
| 7,588,266 B2 | 9/2009 | Fengel et al. | |
| 7,625,048 B2 | 12/2009 | Rouhana et al. | |
| 7,677,343 B2 | 3/2010 | Kitai et al. | |
| 7,690,661 B2 * | 4/2010 | Tsuruta | B60G 21/055 |
| | | | 180/908 |
| 7,753,427 B2 * | 7/2010 | Yamamura | B62D 31/003 |
| | | | 296/64 |
| 7,819,220 B2 * | 10/2010 | Sunsdahl | B60K 17/348 |
| | | | 180/312 |
| 7,819,428 B2 * | 10/2010 | Tsuruta | B62K 5/01 |
| | | | 280/124.109 |
| 7,841,639 B2 * | 11/2010 | Tanaka | B62D 47/003 |
| | | | 296/65.05 |
| 7,845,711 B2 * | 12/2010 | Orrell | B60J 1/1807 |
| | | | 296/146.16 |
| 7,874,605 B2 * | 1/2011 | Smith | B62D 33/00 |
| | | | 296/64 |
| D636,295 S | 4/2011 | Eck et al. | |
| 7,926,862 B2 * | 4/2011 | Smith | B60N 2/305 |
| | | | 296/65.13 |
| 8,007,001 B2 * | 8/2011 | Lin | B60R 21/02 |
| | | | 280/733 |
| 8,123,279 B2 | 2/2012 | Orr et al. | |
| 8,215,694 B2 | 7/2012 | Smith et al. | |
| 8,251,170 B2 * | 8/2012 | Miura | B60K 13/02 |
| | | | 180/68.1 |
| 8,292,352 B2 * | 10/2012 | Furman | B60J 5/0487 |
| | | | 280/748 |
| 8,303,014 B2 * | 11/2012 | Orihashi | B60P 3/423 |
| | | | 296/65.01 |
| 8,328,235 B2 * | 12/2012 | Schneider | B62D 21/183 |
| | | | 296/146.1 |
| 8,382,125 B2 * | 2/2013 | Sunsdahl | B62K 25/00 |
| | | | 280/124.152 |
| 8,464,824 B1 | 6/2013 | Reisenberger | |
| 8,465,050 B1 | 6/2013 | Spindler et al. | |
| 8,548,710 B1 | 10/2013 | Reisenberger | |
| 8,556,324 B1 * | 10/2013 | Yamamoto | B60N 2/3065 |
| | | | 296/65.09 |
| 8,613,335 B2 | 12/2013 | Deckard et al. | |
| 8,640,814 B2 * | 2/2014 | Deckard | B60N 2/38 |
| | | | 296/205 |
| 8,714,591 B1 * | 5/2014 | Kobayashi | B60R 21/06 |
| | | | 248/72 |
| 8,752,878 B2 * | 6/2014 | Yamamoto | B60N 2/3011 |
| | | | 296/183.1 |
| 8,781,705 B1 | 7/2014 | Reisenberger | |
| 8,827,025 B2 | 9/2014 | Hapka | |
| 8,827,028 B2 * | 9/2014 | Sunsdahl | B60K 5/00 |
| 9,216,777 B2 * | 12/2015 | Nakamura | B60K 5/00 |
| 9,701,272 B2 * | 7/2017 | Massa | B60R 21/213 |
| 9,701,346 B2 | 7/2017 | Deckard et al. | |
| 10,246,153 B2 * | 4/2019 | Deckard | B60N 2/58 |
| 2001/0033084 A1 | 10/2001 | Murray et al. | |
| 2002/0135175 A1 | 9/2002 | Schroth | |
| 2002/0190513 A1 | 12/2002 | Svetlik | |
| 2003/0231926 A1 | 12/2003 | Thach | |
| 2004/0251675 A1 * | 12/2004 | Herberg | B60R 22/4604 |
| | | | 280/806 |
| 2005/0073187 A1 | 4/2005 | Frank et al. | |
| 2006/0091702 A1 * | 5/2006 | Essig | B60J 7/194 |
| | | | 296/218 |
| 2007/0018442 A1 | 1/2007 | Kwok | |
| 2008/0023240 A1 * | 1/2008 | Sunsdahl | B60N 2/01 |
| | | | 180/312 |
| 2008/0023249 A1 * | 1/2008 | Sunsdahl | B60N 2/01 |
| | | | 180/312 |
| 2008/0048424 A1 | 2/2008 | Hakansson et al. | |
| 2008/0238045 A1 | 10/2008 | Garner | |
| 2008/0296884 A1 | 12/2008 | Rouhana et al. | |
| 2008/0308334 A1 | 12/2008 | Leonard et al. | |
| 2009/0000849 A1 | 1/2009 | Leonard et al. | |

(56) References Cited

U.S. PATENT DOCUMENTS

| | | | |
|---|---|---|---|
| 2009/0071737 A1 | 3/2009 | Leonard et al. | |
| 2009/0071739 A1 | 3/2009 | Leonard et al. | |
| 2009/0091101 A1 | 4/2009 | Leonard et al. | |
| 2009/0121518 A1 | 5/2009 | Leonard et al. | |
| 2009/0183937 A1 | 7/2009 | Yamamura et al. | |
| 2009/0184531 A1* | 7/2009 | Yamamura | B62D 33/02 |
| | | | 296/65.01 |
| 2009/0184534 A1* | 7/2009 | Smith | B60N 2/06 |
| | | | 296/64 |
| 2009/0184536 A1 | 7/2009 | Kubota | |
| 2009/0184537 A1 | 7/2009 | Yamamura et al. | |
| 2009/0184541 A1 | 7/2009 | Yamamura et al. | |
| 2009/0243339 A1* | 10/2009 | Orr | B60J 5/0487 |
| | | | 160/368.1 |
| 2009/0256388 A1* | 10/2009 | Tanaka | B60N 2/305 |
| | | | 296/64 |
| 2009/0301830 A1* | 12/2009 | Kinsman | F16F 9/0218 |
| | | | 188/289 |
| 2009/0302590 A1 | 12/2009 | Van et al. | |
| 2010/0090797 A1 | 4/2010 | Koenig et al. | |
| 2010/0314191 A1* | 12/2010 | Deckard | B60N 2/01 |
| | | | 180/312 |
| 2011/0297462 A1 | 12/2011 | Grajkowski et al. | |
| 2012/0223500 A1 | 9/2012 | Kinsman et al. | |
| 2013/0033070 A1 | 2/2013 | Kinsman et al. | |
| 2013/0199097 A1 | 8/2013 | Spindler et al. | |
| 2017/0297627 A1 | 10/2017 | Deckard et al. | |

FOREIGN PATENT DOCUMENTS

| | | |
|---|---|---|
| EP | 1600326 A1 | 11/2005 |
| EP | 1602523 A2 | 12/2005 |
| WO | 03/42026 A1 | 5/2003 |
| WO | 03/55716 A1 | 7/2003 |
| WO | 2008/013564 A1 | 1/2008 |

OTHER PUBLICATIONS

European Search Report and Search Opinion Received for EP Application No. 13184887.1, mailed on Jan. 16, 2014, 6 pages.
International Preliminary Report on Patentability received for PCT Patent Application No. PCT/US2010/038709, mailed on Sep. 2, 2011, 46 pages.
International Search Report and Written Opinion issued by the European Patent Office, dated Jan. 14, 2014, for International Patent Application No. PCT/US2013/064516; 23 pages.
International Search Report and Written Opinion received for PCT Patent Application No. PCT/US2010/038709, mailed on Sep. 14, 2010, 10 pages.
Office Action received for European Application No. 13184887.1, mailed on May 11, 2016, 5 pages.
Office Action received for European Application No. 13184887.1, mailed on Oct. 2, 2015, 3 pages.
Patent Examination Report 2 issued by the Australian Government IP Australia, dated Apr. 7, 2016, for Australian Patent Application No. 2013329090; 3 pages.
Patent Office of the People's Republic of China, Search Report in Patent Application No. 201080026656.0, Apr. 21, 2014, 2 pages.
Pictures of Vehicle publicly disclosed in Jul. 2008 (3 pages).
Polaris Industries, Ranger Catalog, 2007 (28 pgs.).
Polaris Industries, Ranger Catalog, 2008, 32 pages.
Robby Gordon's RZR-S 4 seater—Yamaha Rhino Forum—Rhino Forums.net, dated Nov. 11, 2008 (14 pages).
Tellico 4x4.com, Polaris Ranger Accessories and Ranger Parts for Crew 500, 700, 800, XP, available at www.tellico4x4.com/index.php/cPath/3523, last accessed on Mar. 29, 2011.
Translation of the First Office Action issued by the State Intellectual Property Office in Patent Application No. 201080026656.0, Apr. 30, 2014, 5 pages.

* cited by examiner

SIDE-BY-SIDE VEHICLE

CROSS-REFERENCE TO RELATED APPLICATIONS

The present application is a continuation of U.S. patent application Ser. No. 15/642,462, filed Jul. 6, 2017, which is a continuation of U.S. patent application Ser. No. 14/171,635, filed Feb. 3, 2014, which is a continuation of U.S. patent application Ser. No. 12/484,888, filed Jun. 15, 2009, the subject matter of which are expressly incorporated herein by reference.

FIELD OF THE DISCLOSURE

The present invention relates to side-by-side all terrain vehicles having at least two rows of seating areas.

BACKGROUND

Generally, all terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint. It has also become common for riders to customize their vehicles and adding a second row of seats, for example by replacing a utility bed at the rear of the vehicle.

SUMMARY

According to an illustrative embodiment of the present disclosure, a utility vehicle is shown comprising a frame extending in a generally longitudinal direction, a drive train supported by the frame and a plurality of wheels operably coupled to the frame. A first seating area is positioned at a first longitudinal position and a second seating area is positioned at a second longitudinal position. The second seating area is rearward of the first seating area and being profiled such that the hip pivot axis (H-point) of a passenger in the second seating area is higher than the hip pivot axis of a person in the first seating area.

According to a further illustrative embodiment of the present disclosure, a utility vehicle is shown which comprises a frame extending in a generally longitudinal direction, a drive train supported by the frame, and a plurality of wheels operably coupled to the frame. A front axle is coupled to one or more of the plurality of wheels and a rear axle is coupled to one or more of the plurality of wheels. A first seating area is comprised of side-by-side seat positions at a first longitudinal position. A second seating area is comprised of side-by-side seat positions at a second longitudinal position, where the second longitudinal position positions the hip pivot axis (H-point) of a passenger in the second seating area, either above or longitudinally forward of, a centerline of the rear axle.

According to a further illustrative embodiment of the present disclosure, a utility vehicle is shown which comprises a frame extending in a generally longitudinal direction, a drive train supported by the frame, the drive train comprising an engine and a plurality of wheels operably coupled to the frame. A front axle is coupled to one or more of the plurality of wheels and a rear axle is coupled to one or more of the plurality of wheels. A first seating area is positioned at a first longitudinal position and a second seating area is positioned at a second longitudinal position, where a passenger seating position is below a top plane of the engine.

According to yet a further illustrative embodiment of the present disclosure, a utility vehicle is shown which comprises a frame extending in a generally longitudinal direction, a drive train supported by the frame and a plurality of wheels operably coupled to the frame. A first seating area is positioned at a first longitudinal position and a second seating area is positioned rearward of the first seating area. A roll cage is substantially covering the first and second seating areas, the roll cage comprising a front section, a center section and a rear section, the front, center and rear sections being coupled to each other and to the frame.

According to yet a further illustrative embodiment of the present disclosure, a utility vehicle is shown which comprises a frame extending in a generally longitudinal direction, a drive train supported by the frame and a plurality of wheels operably coupled to the frame. A first seating area is positioned at a first longitudinal position and a second seating area is positioned rearward of the first seating area. A hand hold bar is positioned behind the first seating area and a seat belt retractor is mounted to the hand hold bar at a position adjacent to the first seating area.

According to yet a further illustrative embodiment of the present disclosure, a utility vehicle is shown which comprises a frame extending in a generally longitudinal direction having at least one elongate frame tube assembly comprised of plural sections, a drive train supported by the frame and a frame tube coupler coupling the frame tube sections at a longitudinal position within 25% of the length of the frame at either end.

According to yet a further illustrative embodiment of the present disclosure, a utility vehicle is shown which comprises a frame extending in a generally longitudinal direction, and having at least one elongate frame tube assembly comprised of plural sections and a drive train supported by the frame. A frame tube coupler couples the frame tube sections, where the frame tube coupler comprises coupler sections associated with each coupler end, and the coupler sections have an alignment assembly for aligning the coupler sections to each other.

According to a further illustrative embodiment of the present disclosure, an utility vehicle includes a frame extending in a generally longitudinal direction, and having at least one elongate frame tube assembly comprised of plural sections and a drive train is supported by the frame. A frame tube coupler couples the frame tube sections, where the frame tube coupler comprises coupler sections associated with each coupler end, and the coupler sections having complementary interengagement elements. Fasteners retain the interengaging elements together, where the fasteners are in tension to force the complementary interengaging elements into engagement. In this manner, any shear force is substantially taken up by the complementary interengaging elements.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 11 shows an enlarged view of the vehicle front frame;

Figure 1:
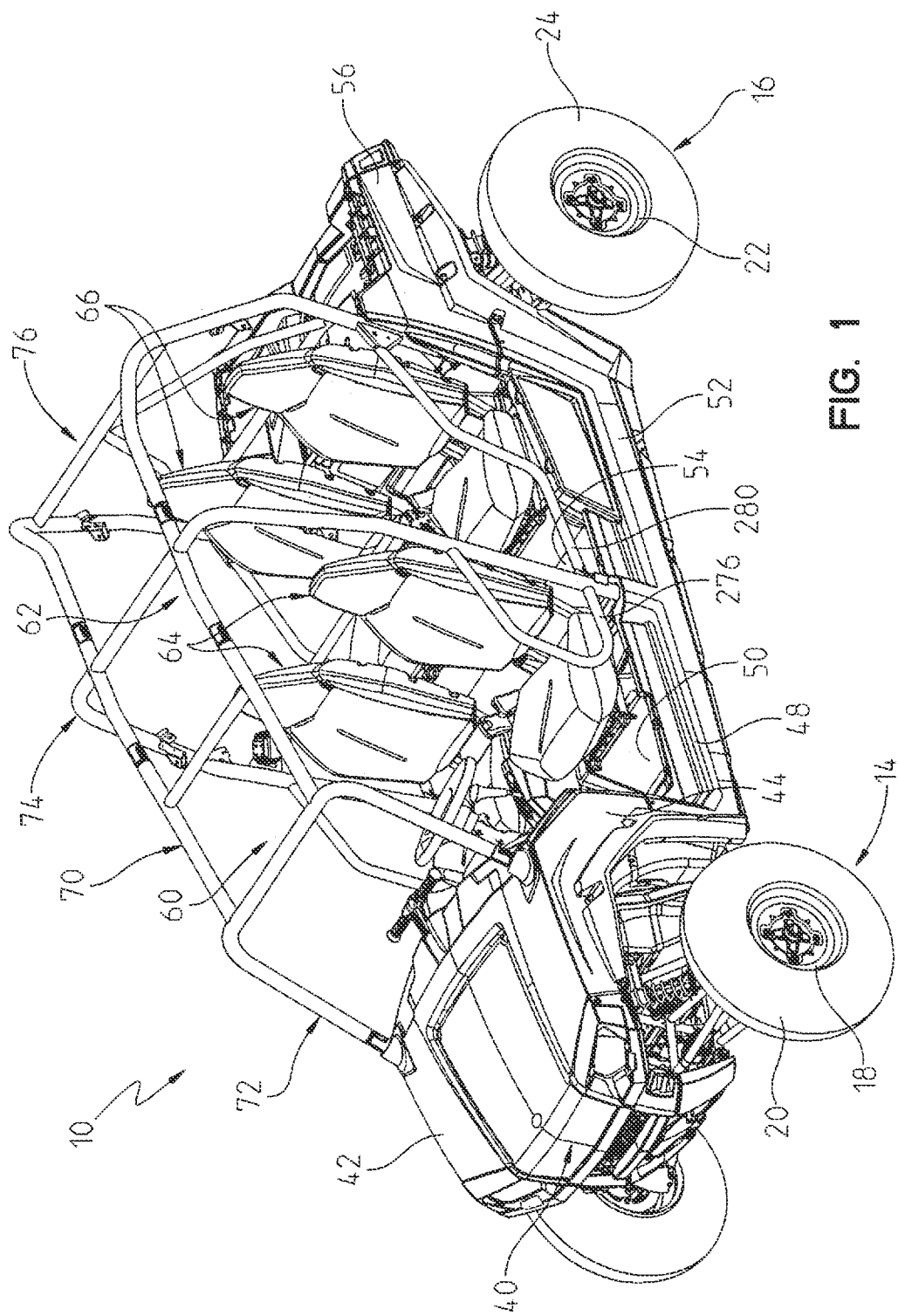
FIG. 1 shows a left front perspective view of the vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE EMBODIMENTS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to UVs, certain features described herein may be applied to other applications such as ATVs, snowmobiles, motorcycles, mopeds, etc.

With reference first to FIGS. 1-6, the vehicle of the present disclosure will be described. The vehicle is shown generally at 10 and is commonly referred to as an all terrain vehicle (ATV), a side-by-side vehicle (S×S) or a utility vehicle. As shown, vehicle 10 generally comprises a frame 12 (FIG. 2) supported by ground engaging members 14 and 16. As shown in this disclosure, ground engaging members 14 and 16 are comprised of wheels 18 and tires 20; and wheels 22 and tires 24. Vehicle 10 further comprises a drivetrain 30 (FIG. 2) operatively connected to frame 12 and drivingly connected to one or more of the ground engaging members 14, 16. In the present disclosure, the drivetrain 30 is comprised of a fuel-burning engine and transmission combination, together with a driveshaft extending between the drivetrain and the front ground engaging members 14. However, any drivetrain could be contemplated such as hybrid, fuel cell or electric. The drivetrain 30, the front and rear suspension assemblies, and steering assemblies are more thoroughly described in our pending application Ser. No. 11/494,891 filed Jul. 28, 2006 and Ser. No. 11/494,890 filed Jul. 28, 2006, the subject matter of which is incorporated herein by reference.

Figure 2:
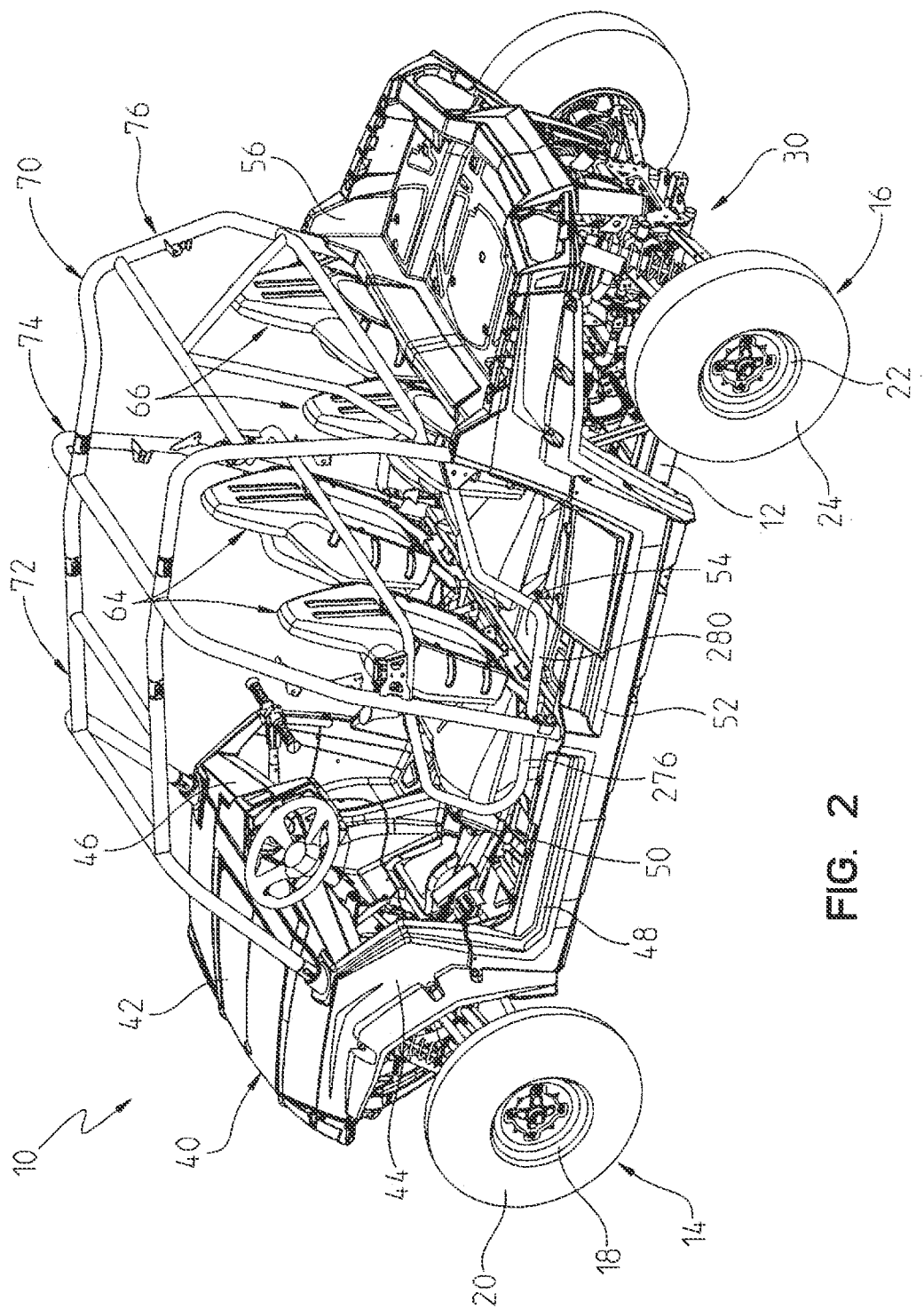
FIG. 2 shows a left rear perspective view of the vehicle of FIG. 1.
Figure 3:
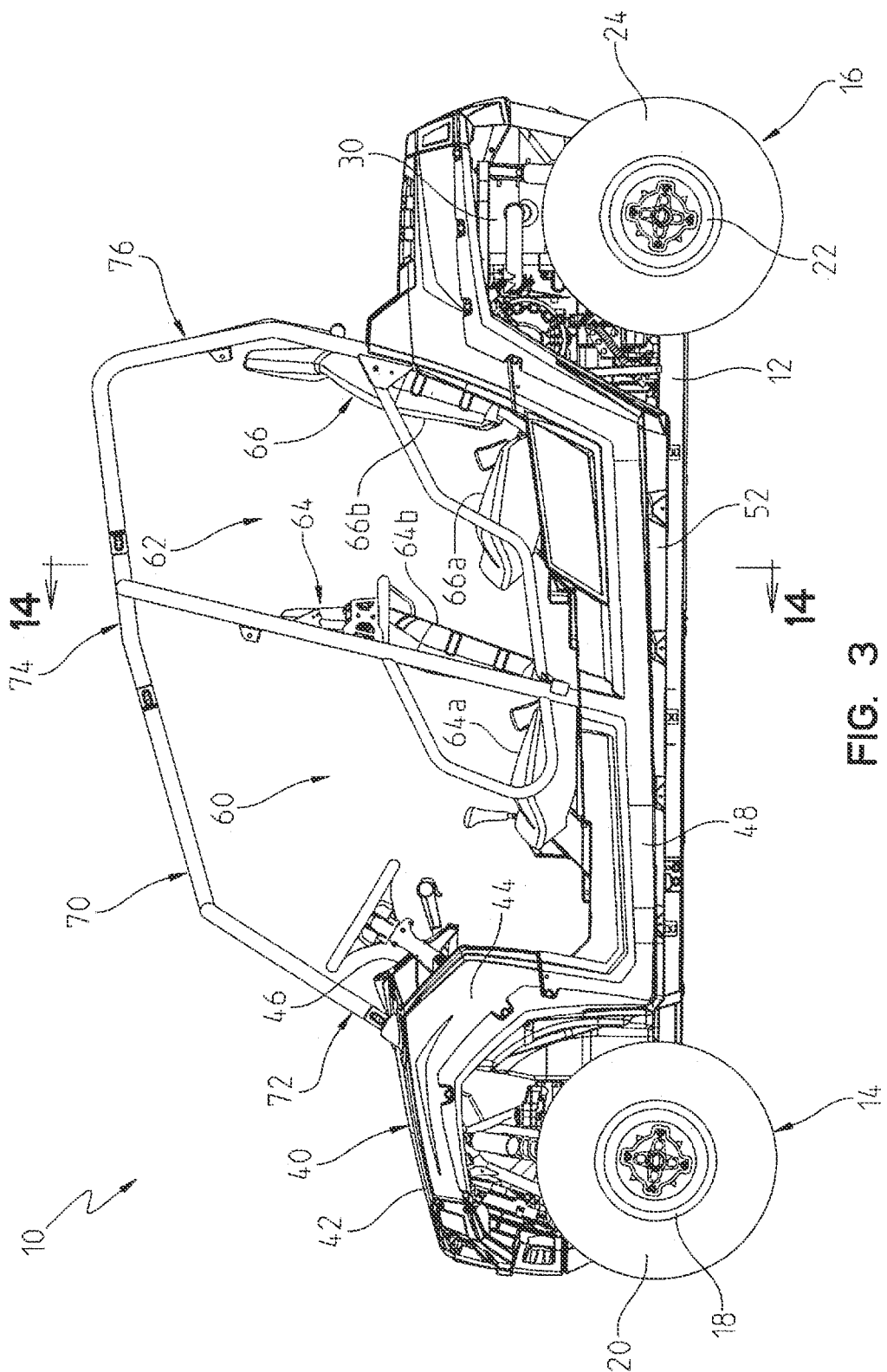
FIG. 3 shows a left side view of the vehicle of FIG. 1.

As shown in FIGS. 1 and 2, vehicle 10 further includes a body portion or chassis shown generally at 40 to include a hood 42, front fender 44, dash 46, sideboard 48, front floorboard 50, rear sideboard 52, rear floorboard 54 and rear cargo area 56. As also shown, vehicle 10 is comprised of two seating areas, namely a front seating area 60 and a rear seating area 62 where front seating area 60 is comprised of side-by-side seats, shown as bucket seats 64; and rear seating area 62 is comprised of side-by-side seats, shown as bucket seats 66. As shown best in FIG. 3, front seats include a seat bottom 64a and a seat back 64b, while rear seat 66 includes a seat bottom 66a and a seat back 66b. Vehicle 10 also includes a roll cage 70 comprised of a front section 72, a center section 74, and a rear section 76, where the front 72, center 74 and rear 76 sections are attached to each other and to frame 12 as more fully described herein.

Figure 9:
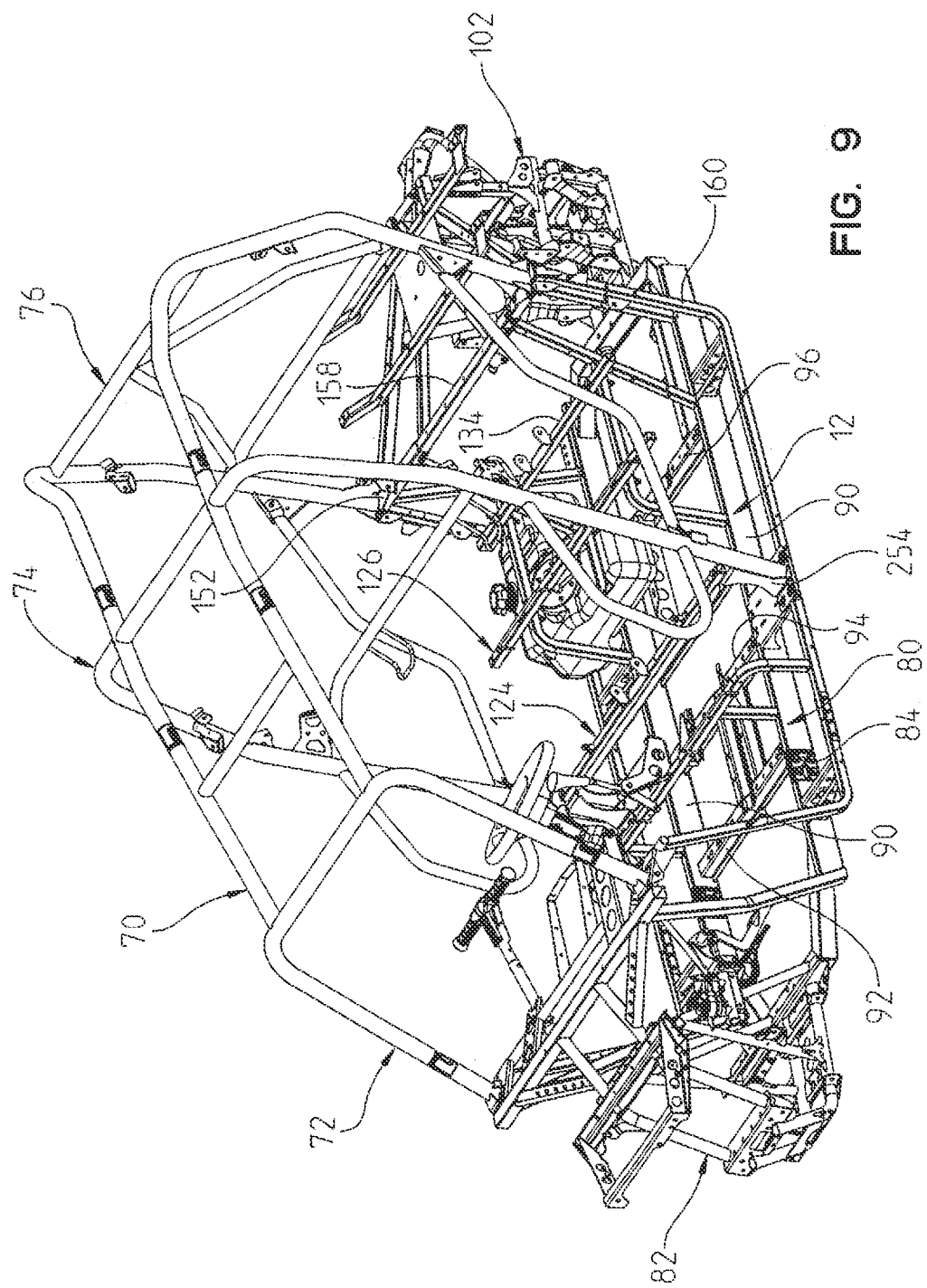
FIG. 9 is a front perspective view of the vehicle frame and roll cage.
Figure 10:
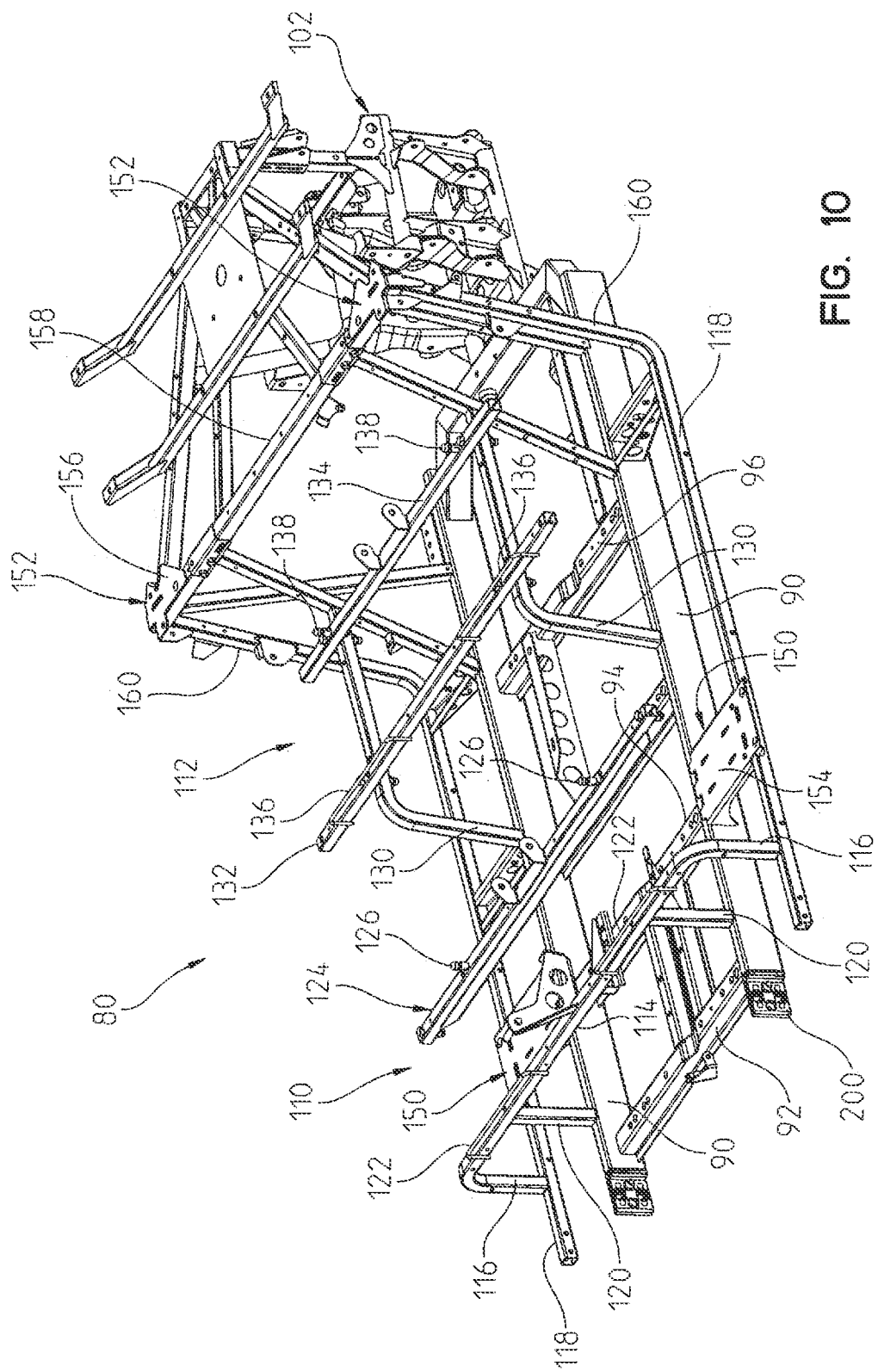
FIG. 10 shows an enlarged view of the vehicle main frame.
Figure 10:
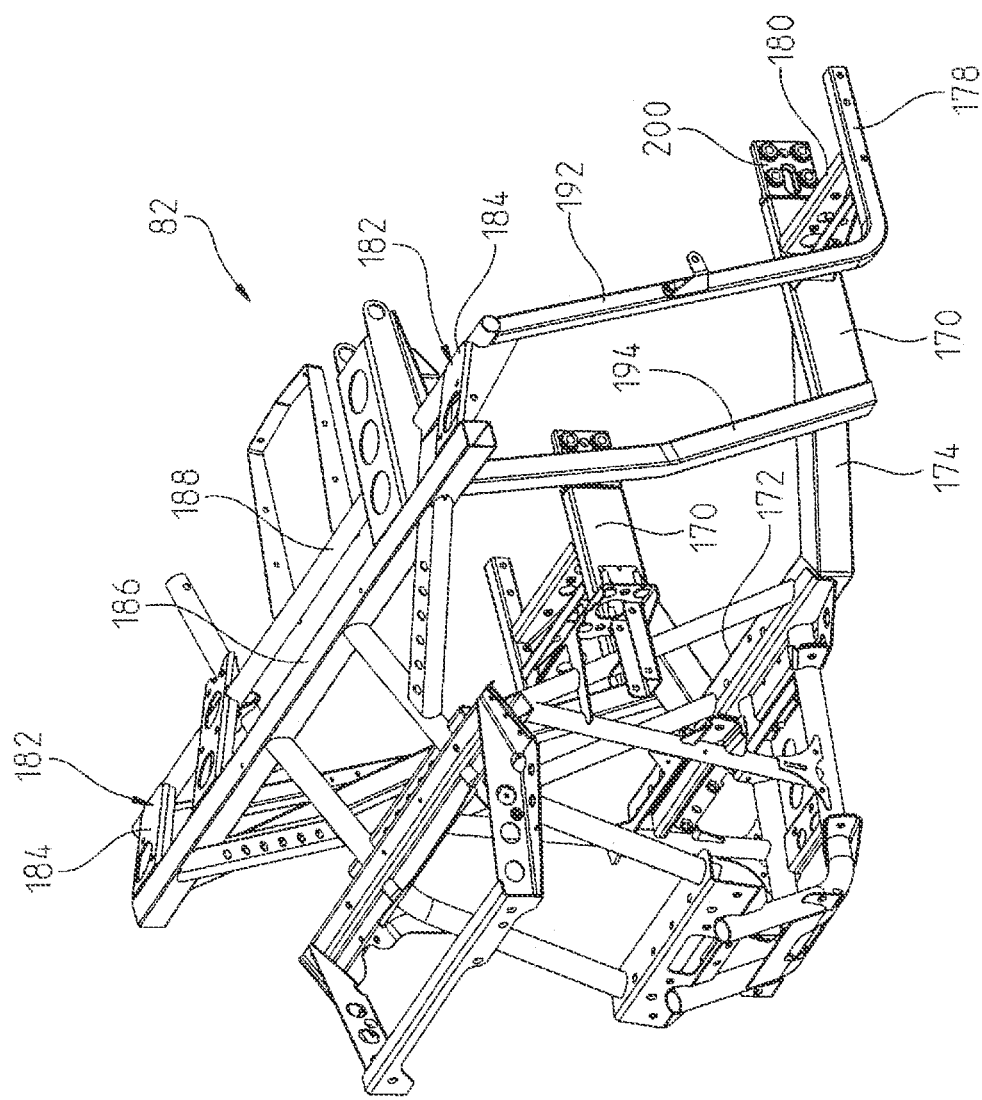

With respect now to FIGS. 7-12, frame 12 will be described in greater detail. Frame 12 is generally comprised of a main frame section 80 and a front frame section 82, where the two sections are interconnected by way of couplers 84. With reference first to FIGS. 9 and 10, the main frame section 80 is generally comprised of two longitudinal frame rails 90 interconnected by a plurality of struts such as 92, 94, 96 attaching frame rails 90 together in a predefined spaced-apart relation. Main frame section 80 also comprises a drivetrain mounting section 102 extending at a rear portion of main frame 80.

With respect now to FIG. 10, frame 80 also defines front seat support platform 110 and rear seat support platform 112. Front seat support platform 110 includes a transversely extending tube 114 having legs 116 attached to outer frame rail 118 and inner legs 120 directly attached to frame tubes 90. Frame tube 114 spans the distance across frame rails 118 and the frame tubes 90. With reference still to FIG. 10, frame tubes 114 include a latch hook 122 as described further herein. Front seat support platform 110 further includes a transverse frame member 124 which as best shown in FIG. 9 is attached to roll cage center section 74 as further described herein. Frame tube 124 includes latching pins 126 for inter-engagement with seats 64.

With reference still to FIG. 10, rear seat support platform 112 is comprised of frame tubes 130 which provide an elevated platform for transverse frame tubes 132 and 134. Frame tubes 132 have latch hooks 136 (similar in nature to latch hooks 122) and frame tube 134 has latching pins 138 (similar to latching pins 126).

With respect still to FIG. 10, main frame member 80 further includes roll cage mounting sections 150 and 152. As shown, mounting section 150 includes a plate 154 on each side spanning tube 90 and frame rail 118. Mounting section 152 is provided by a plate 156 provided on frame tube 158 which spans uprights 160 of frame rail 118.

With respect now to FIG. 11, front frame member 82 will be described in greater detail. Front frame member 82 includes frame tubes 170 which complement frame tubes 90, and are held in a fixed relation by tubes 172, 174. Frame rails 178 are fixed in relation to frame tubes 170 by way of a strut 180. Front frame 82 further comprises front roll cage mounting sections 182 comprising plates 184 positioned between cross tubes 186, 188, and elevated by way of uprights 192, 194.

As described, frame 80 is comprised of main frame member 90 and front frame member 82. Splitting the frame into two separate modular subassemblies allows for easier processing of the entire vehicle 10. Due to the load on the frame tubes 90, 170, the connection provided by coupler 84 takes place at a longitudinal position from either end of the frame 80, within a distance from the end, of approximately 30% of the length of frame 80. The coupler 84 could also be placed at the rear of frame tubes 90.

Figure 12:
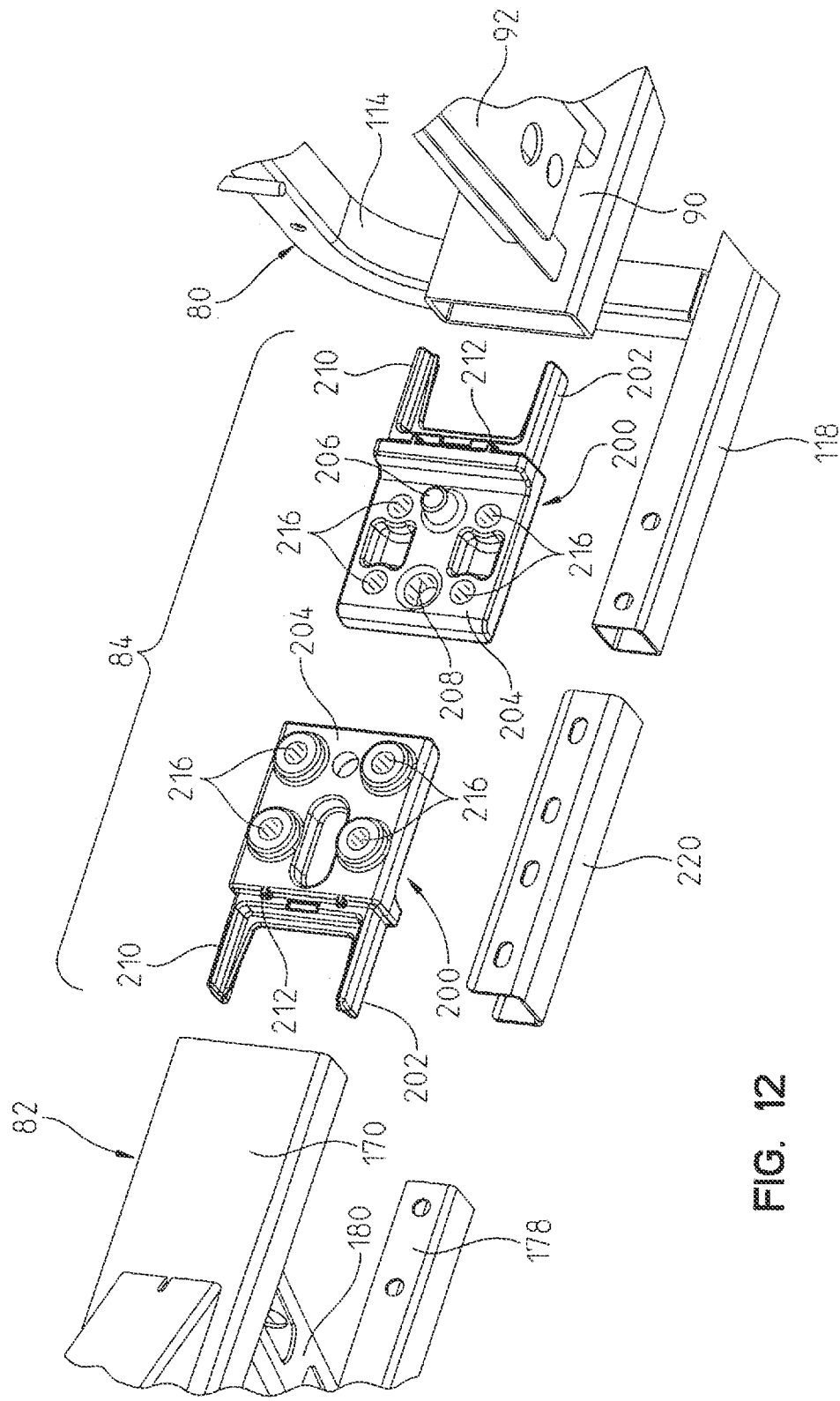
FIG. 12 is a partially exploded and fragmented perspective view showing the coupler for coupling the main frame and front frame together.

With reference now to FIG. 12, frame tube coupler 84 is shown poised for receipt within frame tubes 90, 170. As shown, coupler 84 is comprised of individual coupler members 200. The coupler members 200 are identical, and each comprises a tube connecting section 202 and an alignment or interengaging section 204. The interengaging sections 204 include interengaging elements, shown here as projections 206 and recesses 208. Projections 206 are shown as frusto-conical in shape, and recesses have a complementary frusto-conical recessed configuration. The interengaging sections 204 further comprise apertures 216 which self align with apertures 216 in the opposite interengaging section 204 when complementary projections 206 and recesses 208 align. As also shown in FIG. 12, tube connecting sections 202 include legs 210 and stand-offs 212. Finally, a connecting bracket 220 is provided for connecting frame rails 118 and 178.

To connect main frame member 80 and front frame member 82, the individual coupler members 200 are each inserted into respective ends of the frame tubes 90, 170 until such time as stand-offs 212 abut an end edge of the frame tubes 90, 170. Stand-off 212 leaves a weld gap for welding the individual couplers 200 to the frame tubes 90, 170. The individual couplers 200 are shown welded in place to respective frame tubes 90, 170 in FIGS. 10 and 11.

Coupler 84 allows alignment of frame tubes 90 and 170 as individual couplers 200 are each aligned with respective frame tubes 90, 170 and individual couplers 200 are alignable to each other. Couplers 84 also allow alignment of frame tubes 90, 170 when the main frame 80 and front frame 82 are not themselves perfectly aligned. That is, once individual coupler members are close to alignment, fasteners (not shown) are positioned into and through complementary apertures 216, whereby the fasteners may be drawn tight until the projections and recesses are in engagement with each other. This aligns the tubes 90, 170. At the same time, any shear forces on the coupler 84 is taken up through the projections and recesses, not through the fasteners.

Figure 13:
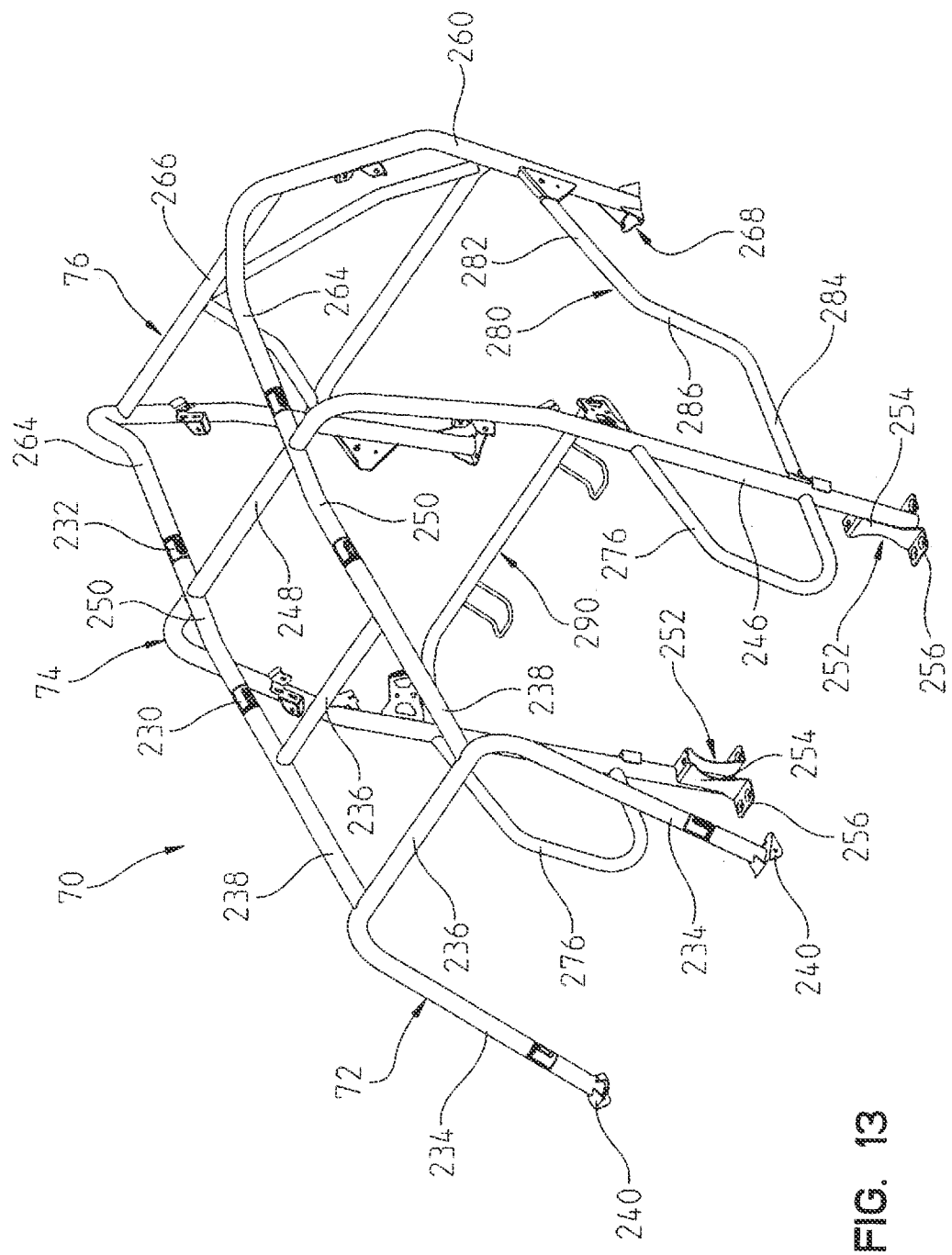
FIG. 13 shows a top perspective view of the roll cage.

With respect now to FIG. 13, roll cage 70 is shown comprised of front 72, center 74 and rear 76 roll cage sections; and are shown connected at connection joints 230 and 232. Such joints are known in the industry.

Front roll cage section 72 is comprised of uprights 234, transverse sections 236, and longitudinally extending sections 238. Mounts 240 are provided at the front and extend from uprights 234. It should be appreciated that mounts 240 cooperate with mounting sections 182 (FIG. 11) by way of fasteners (not shown).

Center roll cage section 74 is comprised of uprights 246, transverse section 248 and longitudinally extending sections 250. Mounts 252 are provided at the lower end of upright 246 and is comprised of stand-offs 254 and mounting brackets 256. It should be appreciated that mounting brackets 256 cooperate with mounting section 150 (FIG. 10) by way of fasteners (not shown).

Rear roll cage section 76 is comprised of uprights 260, transverse section 262, and longitudinally extending section 264. Mounts 268 are provided at the lower end of uprights 260 which cooperate with mounting sections 152 (FIG. 10).

Roll cage assembly 70 comprises ergonomic features for the driver and passengers. First, supports 276 are provided on uprights 246 extending forwardly. These supports are positioned adjacent to seats 64, as shown in FIGS. 1 and 2, and enclose the driver and front passenger. Second, supports 280 are provided between uprights 246 and 260, and include an upper portion 282, lower portion 284 and transition portion 286. As shown in FIG. 1, support 280 is shown in position where lower portion extends across the entry spaced above floorboard 54. Transition section 286 and upper portion 282 extend across the seat 66 and enclose the rear passengers. Finally, rear passenger hand bar 290 extends between uprights 246, and as best shown in FIG. 14, extends behind front seats 64, as described below.

Figure 14:
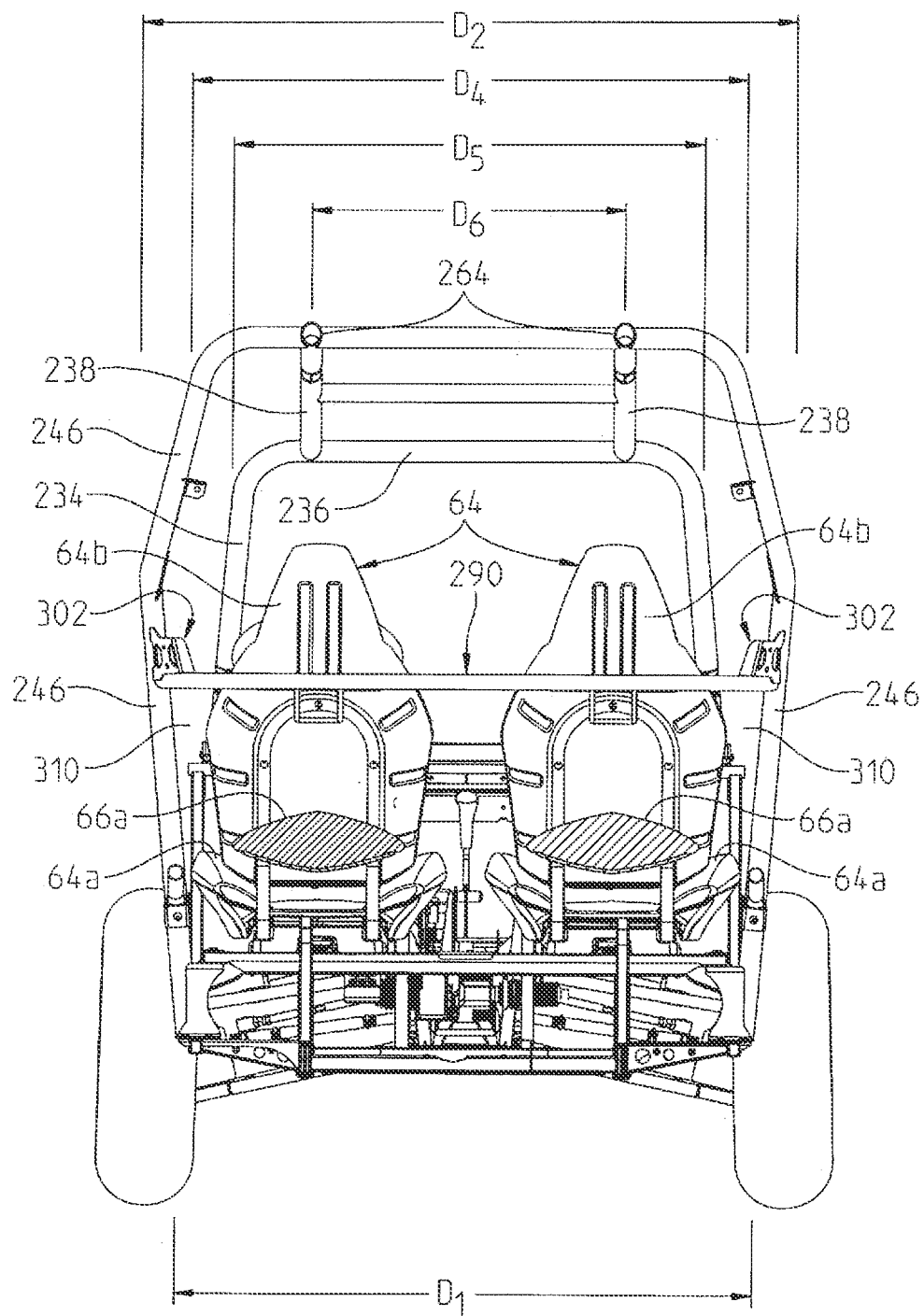
FIG. 14 shows a cross-sectional view through lines 12-12 of FIG. 3.
Figure 15:
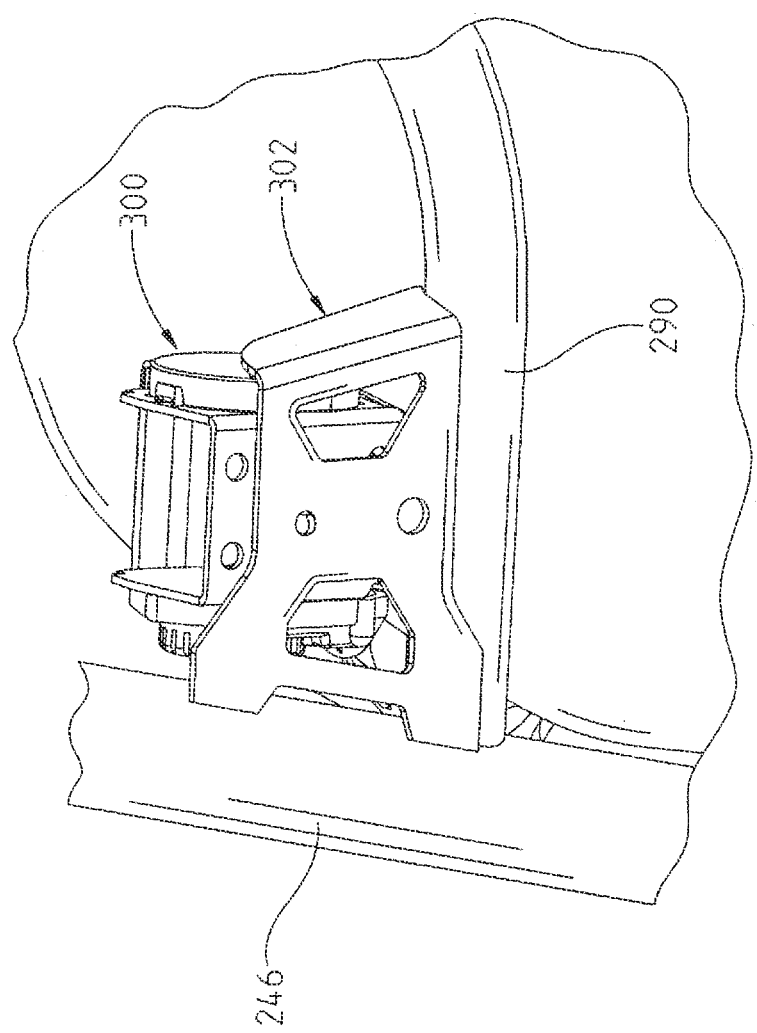
FIG. 15 shows an enlarged view of the seat belt retractor.

As shown in FIG. 14, rear seat bottoms 66a are shown elevated relative to front seat bottoms 64a. Thus the rear passenger hand bar 290, which extends behind front seat backs 64b is positioned at shoulder height relative to the persons in front seats 64. As shown best in FIG. 15, seat belt retractor 300 is positioned on hand bar 290, and is attached to bracket 302 which is connected between hand bar 290 and upright 246. This places the seat belt retractor 300 in a convenient location for those in front seats 64, yet keeps the retractor away from the rear passengers.

Vehicle 10 is also ergonomically designed for the rear passenger's riding experience. For example, and with respect still to FIG. 14, uprights 246 are shown flaring outwardly. For example, uprights at the frame are spaced apart by a dimension of $D_1$ but extend upwardly to a dimension of $D_2$ which is larger than $D_1$. This provides a spacing at 310 between uprights and seat backs 64b providing extra room for the passenger's knees.

Figure 4:
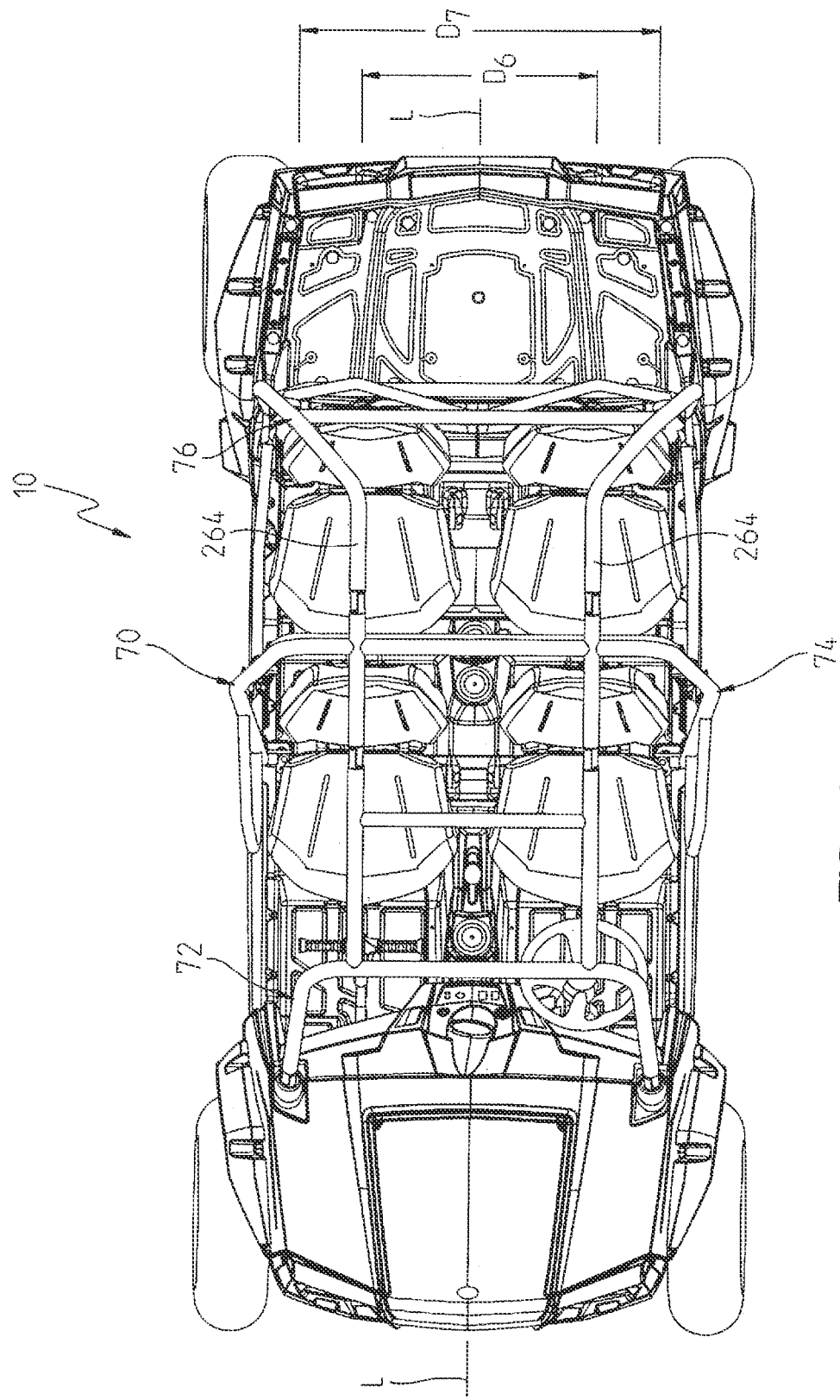
FIG. 4 shows a top view of the vehicle of FIG. 1.
Figure 6:
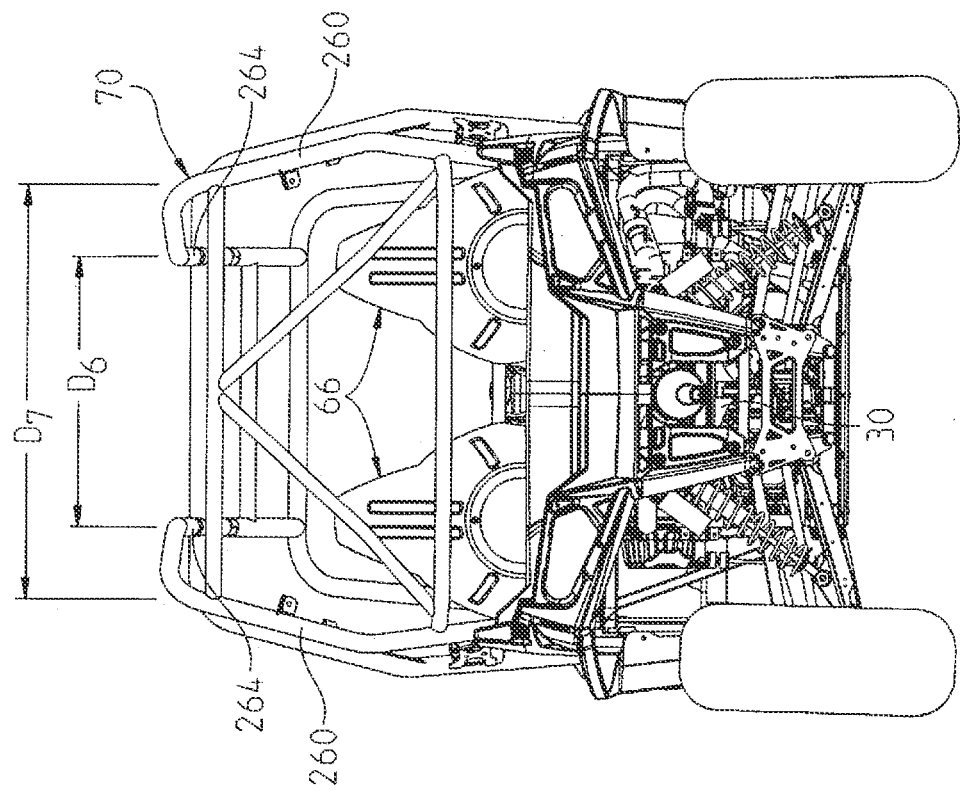
FIG. 6 shows a rear view of the vehicle of FIG. 1.
Figure 5:
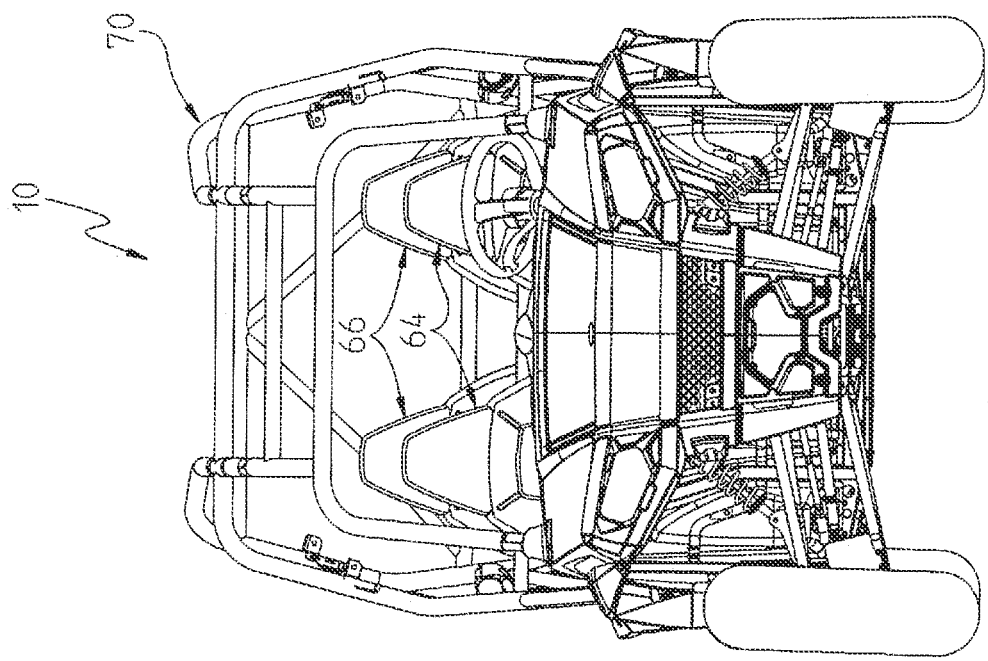
FIG. 5 shows a front view of the vehicle of FIG. 1.
Figure 7:
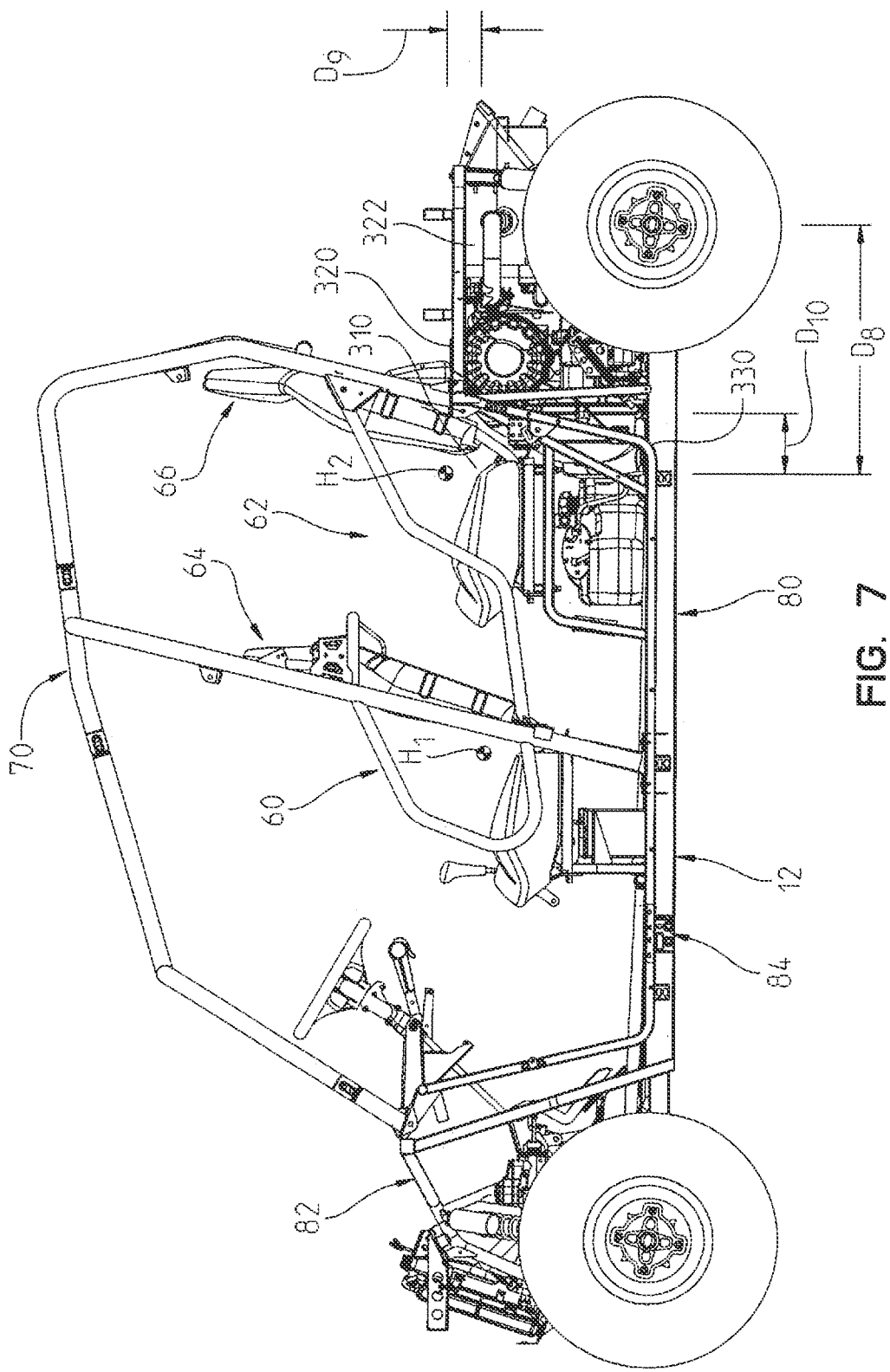
FIG. 7 shows a left side view of the vehicle similar to that of FIG. 3 showing the chassis removed.
Figure 8:
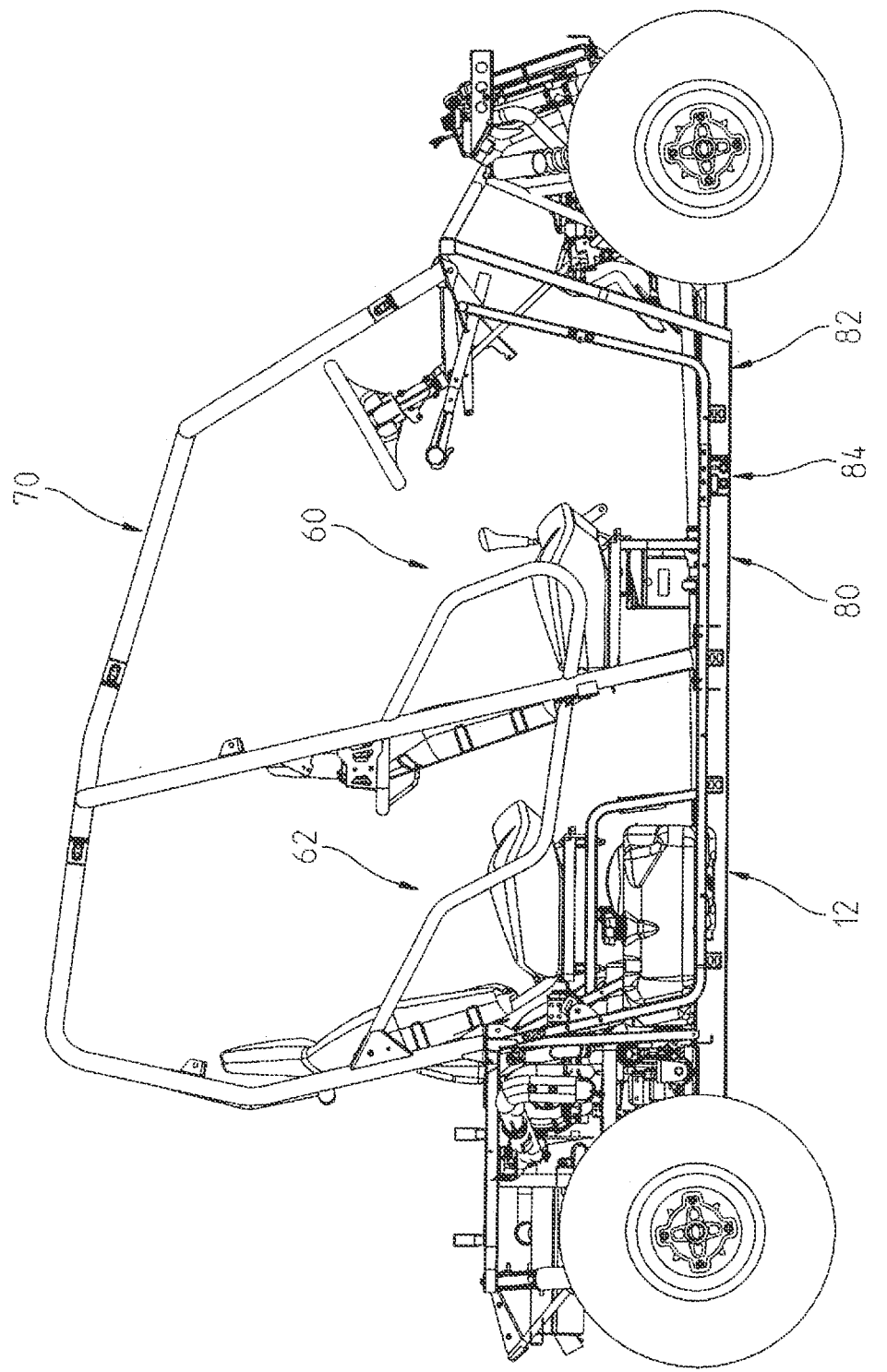
FIG. 8 shows the right side view of the vehicle of FIG. 7.

The vehicle design also provides easy ingress and egress. As shown best in FIG. 14, the driver and front passenger may easily enter vehicle 10 without contacting longitudinally extending sections 238. This is due to the fact that the distance ($D_6$) between sections 238 is less than the extreme position adjacent the top of uprights 234 ($D_5$) and is less than the distance between the extreme position adjacent the top of uprights 246 ($D_4$). This insetting of longitudinally extending sections 238 provides easy ingress. In a like manner relating to the rear passengers, and as best shown in FIGS. 4, 6 and 14, longitudinally extending section 264 are inset from extreme positions of both uprights 246 and 260, that is De is less than both $D_2$ and $D_7$ (FIGS. 4 and 6). This provides easy ingress for rear passengers.

The design also provides an enhanced ride for the rear passenger. Due to the elevated rear seats 66, the rear passengers can view over the top of the front seats 64. As shown best in FIG. 7, the elevation of the seats is such that the hip pivot axis (H-point) of the rear passenger ($H_2$) is higher than the H-point of the driver ($H_1$). Also, for ride purposes, the H-point of the rear passenger ($H_2$) is positioned either over, or forward of, the centerline of the rear axle. As shown best in FIG. 7, $H_2$ and the axle centerline are spaced apart by a distance $D_8$. Also, in order to enhance the ride of the rear passenger, as well as keep the center of gravity low, a seating position 310 of the rear passenger is positioned lower than a top 320 of the engine 322. The seating position is the location on the seat having the highest distribution of load from the passenger while idle. This area is normally substantially adjacent to an intersecting line through the torso of the passenger and the seat bottom 66a. In the illustrated embodiment of FIG. 7, this distance is shown as $D_9$. Finally, seating position 310 is also forward of, a forward most point 330 of engine 322, and as shown best in FIG. 7, this distance is depicted as $D_{10}$. It should be appreciated that the seating positions could also be lower than the highest point 320 of engine 322 and behind the forward most point 330, if the seats laterally straddled the engine 322.

Figure 16:
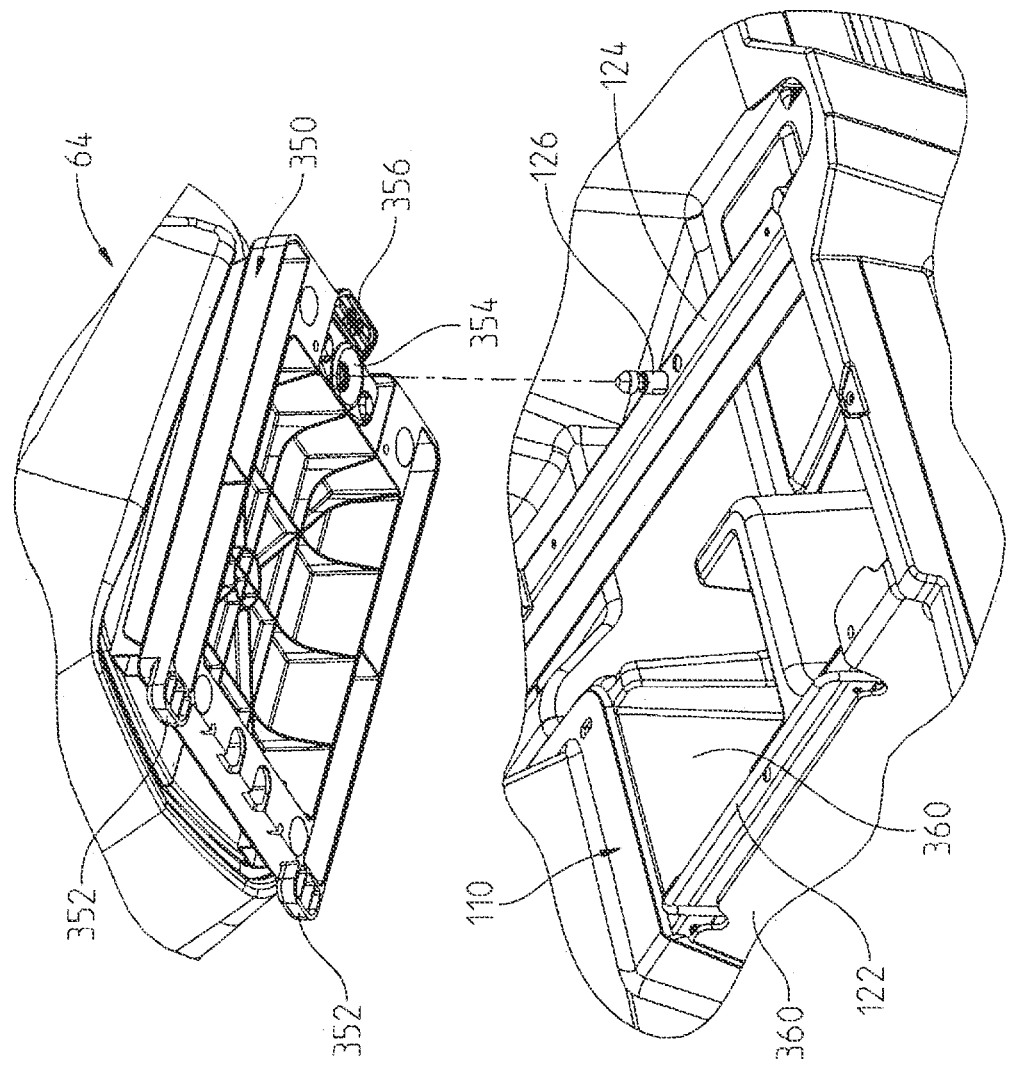
FIG. 16 shows a perspective view of the seat poised for receipt in one of the seating areas.

With respect now to FIG. 16, the vehicle 10 provides enhanced serviceability and functionality. As shown, each seat 64, 66 may be removed. The seat 64 is shown having a lower base 350 having locking feet 352 receivable under latch hook 122 and a latch 354 which is receivable over latching pin 126. Latch release 356 releases latch 354 from the latch-locked condition. Latch 354 is substantially similar to the latch shown in pending U.S. application Ser. No. 12/246,948 filed Oct. 7, 2008 (This is the X2 seat). This provides access to a battery (not shown) in battery box 360. Also as transverse tube 124 is bolted to stand-offs 254 (FIG. 9), removal of tube 124 allows the molded covering 360 to be easily removed.

It should be appreciated that one or more of the rear seats 66 may be removed in an identical manner to that described with respect to front seats 64. Removing one or more of the rear seats may be desired if extra storage space is required and the space is not required for a rider. Also, accessory mounts could be provided (having a similar construction and footprint to that of seat base 350) and snapped in place in one or both seat positions. For example, such accessories could include coolers, tool boxes, trunks, water tanks, fuel containers, camping/fishing gear, a dog crate/kennel, and the like. This enhances the functionality of vehicle 10.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a frame extending in a generally longitudinal direction;
a drive train supported by the frame, the drive train comprising an engine;
a plurality of wheels operably coupled to the frame, the plurality of wheels comprising a first wheel and a second wheel;
a first seating area positioned at a first longitudinal position, the first seating area being rearward of the first wheel and forward of the second wheel;
a second seating area positioned at a second longitudinal position, the second seating area being rearward of said first seating area, a seat bottom of the second seating area being forward of the engine, a front plane of the engine being forward of the second wheel, the seat bottom being below a top plane of the engine, and the second seating area being profiled such that an uppermost seating surface of the second seating area is higher than an uppermost seating surface of the first seating area.

2. The utility vehicle of claim 1, wherein the first seating area is comprised of side-by-side seating supports.

3. The utility vehicle of claim 2, wherein the first side-by-side seating supports are defined by a pair of bucket seats.

4. The utility vehicle of claim 1, wherein the second seating area comprises side-by-side seating supports.

5. The utility vehicle of claim 4, wherein the second side-by-side seating supports are defined by a pair of bucket seats.

6. The utility vehicle of claim 4, wherein the second seating area further comprises a second seating platform coupled to the frame, and the side-by-side seating supports are coupled to the second seating platform.

7. The utility vehicle of claim 6, wherein the side-by-side seating supports are latchably removable from the second seating platform.

8. The utility vehicle of claim 1, wherein the front plane of the engine is forward of a forwardmost point of the second wheel.

9. A utility vehicle, comprising:
a frame extending in a generally longitudinal direction;
a drive train supported by the frame;
a plurality of wheels operably coupled to the frame;
a front axle coupled to one or more of the plurality of wheels;
a rear axle coupled to one or more of the plurality of wheels;
a first seating area comprised of side-by-side seat positions at a first longitudinal position;
a second seating area comprised of side-by-side seat positions at a second longitudinal position, where the second longitudinal position positions an uppermost seating surface of the second seating area above an uppermost seating surface of the first seating area and either above or longitudinally forward of a centerline of the rear axle, and where the side-by-side seat positions comprise a headrest position;
a hand hold bar positioned behind the first seating area, the hand hold bar being positioned vertically between the headrest position and the hip pivot axis of the passenger in the second seating area; and
an upper frame, the upper frame comprising a front section, a center section, and a rear section, the front, center, and rear sections being coupled to each other and removably coupled to the frame.

10. The utility vehicle of claim 9, wherein the first seating area is comprised of side-by-side seating supports.

11. The utility vehicle of claim 10, wherein the first side-by-side seating supports are defined by a pair of bucket seats.

12. The utility vehicle of claim 9, wherein the second seating area comprises side-by-side seating supports.

13. The utility vehicle of claim 12, wherein the second side-by-side seating supports are defined by a pair of bucket seats.

14. The utility vehicle of claim 12, wherein the second seating area further comprises a second seating platform coupled to the frame, and the side-by-side seating supports are coupled to the second seating platform.

15. The utility vehicle of claim 14, wherein the side-by-side seating supports are latchably removable from the second seating platform.

16. A utility vehicle, comprising:
a frame extending in a generally longitudinal direction, the frame being comprised of a plurality of frame sections;
a drive train supported by the frame, the drive train comprising an engine;
a plurality of wheels operably coupled to the frame, the plurality of wheels comprising a first wheel and a second wheel;
a first seating area positioned at a first longitudinal position, the first seating area being rearward of the first wheel and forward of the second wheel;
a second seating area positioned at a second longitudinal position, the second seating area being rearward of said first seating area and being profiled such that an uppermost seating surface of the second seating area is higher than an uppermost seating surface of the first seating area and forward of the second wheel, rearmost edges of the seating surfaces in combination defining a plane extending therethrough, the plane extending above a top of the second wheel, wherein a bottom of the second seating area is entirely forward of the engine and the plane extends above a top of the engine.

17. The utility vehicle of claim 16, further comprising a frame coupler that couples together the frame sections, the frame coupler comprising coupler sections associated with each coupler end, and the coupler sections having an alignment assembly for aligning the coupler sections to each other.

18. The utility vehicle of claim 17, wherein the frame coupler couples the frame sections together at a longitudinal position within 25% of the length of the frame at either end thereof.

19. The utility vehicle of claim 17, wherein the frame coupler comprises coupler sections associated with each coupler end, and wherein the coupler sections have complementary interengagement elements.

20. The utility vehicle of claim 19, wherein fasteners retain the interengaging elements together, and wherein the fasteners are in tension to force the complementary interengaging elements into engagement.

21. The utility vehicle of claim 16, wherein the rearmost edge of the seating surface of the second seating area is forward of a forwardmost point of the second wheel.

\* \* \* \* \*